(12) United States Patent
Acker et al.

(10) Patent No.: US 7,072,752 B2
(45) Date of Patent: Jul. 4, 2006

(54) METHOD FOR INFLUENCING THE ROLL BEHAVIOR OF MOTOR VEHICLES

(75) Inventors: Bernd Acker, Esslingen (DE); Gerhard Meier, Wernau (DE); Walter Schulz, Stuttgart (DE)

(73) Assignee: Daimler Chrysler AG, Stuttgart (DE)

( * ) Notice: Subject to any disclaimer, the term of this patent is extended or adjusted under 35 U.S.C. 154(b) by 299 days.

(21) Appl. No.: 10/781,324

(22) Filed: Feb. 18, 2004

(65) Prior Publication Data

US 2004/0176890 A1    Sep. 9, 2004

Related U.S. Application Data

(63) Continuation-in-part of application No. PCT/EP02/09128, filed on Aug. 15, 2002.

(51) Int. Cl.
*B60G 17/015* (2006.01)
*B60K 5/04* (2006.01)
*B62D 9/00* (2006.01)

(52) U.S. Cl. .................... 701/38; 701/48; 701/91; 280/5.502; 280/5.507; 180/282; 340/440

(58) Field of Classification Search ........... 701/37, 701/38, 41, 48, 80, 91; 180/282; 340/440; 280/725, 5.502, 5.507
See application file for complete search history.

(56) References Cited

U.S. PATENT DOCUMENTS

| | | | |
|---|---|---|---|
| 4,984,163 A | | 1/1991 | Kuwana et al. ............. 701/80 |
| 5,381,335 A | * | 1/1995 | Wolf .......................... 701/37 |
| 5,396,423 A | * | 3/1995 | Fujimura et al. ............ 701/38 |
| 5,408,411 A | | 4/1995 | Nakamura et al. .......... 701/48 |
| 5,948,027 A | * | 9/1999 | Oliver et al. ................ 701/37 |
| 6,088,637 A | * | 7/2000 | Acker et al. ................ 701/38 |
| 6,295,493 B1 | * | 9/2001 | Kawazoe .................... 701/38 |
| 6,298,294 B1 | * | 10/2001 | Murata et al. .............. 701/37 |
| 6,324,446 B1 | * | 11/2001 | Brown et al. ................ 701/1 |

FOREIGN PATENT DOCUMENTS

DE    196 47 300    5/1998
DE    198 36 674    5/2000

OTHER PUBLICATIONS

Andreas Senger, "Neues Abc Der Fahrwerktechnik", TechnischeRundschau, No. 11, 1999, month is not available.

* cited by examiner

*Primary Examiner*—Tan Q. Nguyen
(74) *Attorney, Agent, or Firm*—Klaus J. Bach

(57) ABSTRACT

In a method for influencing the roll behavior of a motor vehicle having at least one axle with wheels at opposite sides of the motor vehicle, vehicle body movements caused by transverse forces acting at the center of gravity are reduced in that for each vehicle axle wheel, a stabilizer with a hydraulic actuator generating a controllable force is provided and the stabilizer force is transmitted to the respective wheels and vehicle body for counteracting the vehicle body roll movements so as to improve the roll behavior of the vehicle with respect to accuracy and reaction speed.

5 Claims, 4 Drawing Sheets

METHOD FOR INFLUENCING THE ROLL BEHAVIOR OF MOTOR VEHICLES

This is a Continuation-In-Part Application of international application PCT/EP02/09128 filed Aug. 15, 2002 and claiming the priority of German application 10140604.5 filed Aug. 18, 2001.

BACKGROUND OF THE INVENTION

The invention relates to a method for influencing the roll behavior of motor vehicles having at least three wheels. At each wheel, at least one actuator is arranged between stabilizers acting on the wheels and the vehicle body, or between the stabilizer sections of two wheels of an axle. The steering wheel angle, the traveling speed, the transverse acceleration of the motor vehicle and at least the engine speed are measured. The theoretical transverse acceleration of the vehicle is calculated from the steering wheel angle and the traveling speed. The roll momentum distribution between the vehicle axles is calculated from the measured transverse acceleration or the calculated transverse acceleration, the engine speed and a variable which is proportional to the position of the accelerator pedal. The actuator forces are determined from the data relating to the transverse acceleration and the roll momentum distribution. The supply of energy to the corresponding actuators is controlled on the basis of the data relating to the respective actuator forces.

Such a method is known from a presentation: "Aktive Roll-Stabilisation—eine kostengünstige Losung zur aktiven Fahrwerksregelung [Active roll stabilization—a cost-effective solution for active chassis control]" given at the Haus der Technik e.V., Essen 1993; Veranstaltungsnummer [event number] T306330563. The document describes an active chassis system which has the function of improving the transverse dynamics of the vehicle. The method is concerned with reducing the vehicle body movement under the influence of a transverse force acting at the center of gravity. It requires a stabilizer which is divided in two for each vehicle axle on the motor vehicle. A hydraulic actuator which can twist the two stabilizer halves with respect to one another is arranged at the separating joint of the stabilizer. The torque which is applied to the stabilizer is transmitted via the stabilizer legs on the respective wheel carriers. The reaction forces are effective on the body of the vehicle. As a result, a torque about the roll axis acts on the body of the vehicle. A roll momentum which is caused by the transverse force of the vehicle can be compensated by this torque.

In order to control the actuators, on the one hand the steering wheel angle and the traveling speed are sensed in order to calculate from them the transverse acceleration acting on the vehicle body. The transverse acceleration can also be measured directly. On the other hand, the rotational speed and the throttle valve angle of the internal combustion engine which drives the motor vehicle are sensed. Inter alia, the change in the traction force or the roll momentum distribution is determined from these measured values. The transverse acceleration and the roll momentum distribution determine the forces which are used in the actuators on the various vehicle axles.

DE 198 36 374 C1 discloses a method for influencing the roll behavior. Here, transverse forces acting via the center of gravity are twisted with respect to one another by means of a stabilizer which is divided in two and an actuator which is located at this division. The torques applied via the stabilizer halves are transmitted to the corresponding wheels via jibs which are permanently connected to the stabilizer halves, in order thus to support roll movements of the vehicle body.

It is therefore the object of the present invention to improve the method for influencing the roll behavior with respect to accuracy and reaction speed, and to make it more universal.

SUMMARY OF THE INVENTION

In a method for influencing the roll behavior of a motor vehicle having at least one wheel axle with wheels at opposite sides of the motor vehicle, vehicle body movements caused by transverse forces acting at the center of gravity are reduced in that for each vehicle axle wheel, a stabilizer with a hydraulic actuator generating a controllable force is provided and the stabilizer force is transmitted to the respective wheels and the vehicle body for counteracting the vehicle body roll movements so as to improve the roll behavior of the vehicle with respect to accuracy and reaction speed.

In the new method, the wheel speeds at least at two wheels of an axle are measured, and the traveling speed which is necessary to calculate the transverse acceleration is determined from the wheel speeds. The calculated transverse acceleration is referred to below as theoretical transverse acceleration. The engine torque is measured at the drive engine or is derived from engine-typical measurement data and/or characteristic diagrams. The theoretical transverse acceleration is compared with a threshold value. The actuators remain inactive until the threshold value is reached. When the threshold value is exceeded, the difference between the theoretical transverse acceleration and the measured transverse acceleration is determined. The difference is then compared with a differential threshold value, the calculated transverse acceleration being used as the momentary transverse acceleration until this differential threshold value is reached. When the differential threshold value is exceeded, the measured transverse acceleration is defined as the momentary transverse acceleration. In addition, a theoretical roll momentum distribution is determined for a predefined, usual traveling state range as a function of the rotational speeds of the vehicle wheels or the average rotational speed of the wheel pairs of individual axles, the momentary transverse acceleration and the change in the drive torque. The rotational speeds of the axles or wheels, the current transverse acceleration and the change in the drive torque are each compared with corresponding threshold values, the theoretical roll momentum distribution being used as the momentary roll momentum distribution until the threshold values are reached. When at least two of the aforesaid threshold values are exceeded, a new, momentary roll momentum distribution is calculated. The actuation forces of the actuators are then calculated as functions of the momentary transverse acceleration and the momentary roll momentum distribution, converted into signals for actuating the actuators, and the actuators are energized in order to generate the forces as determined.

The method largely prevents rolling when cornering. It permits the traveling behavior to be influenced positively by means of a variable roll momentum distribution, for example between a front axle and a rear axle. For this purpose, the stabilizers on the front axle and the rear axle are twisted using suitable actuators. For example, the hydraulic motors which are known from DE 196 47 300.4 can be used as actuators. Alternatively, pneumatic or electromechanical actuators can also be used.

An actuator can be arranged between the two halves of a U stabilizer. If the stabilizer is a slewing motion motor, for example the right-hand stabilizer half is flange-connected to the stator, while the left half is part of the rotor. Both halves can be turned hydraulically with respect to one another and locked. A large degree of decoupling of the stabilizer halves is possible.

The actuators can also be arranged between each stabilizer half and the vehicle body, with the result that the coupling of the stabilizer halves is simulated hydraulically, pneumatically or electromechanically.

When cornering, a force or a moment is built up at least approximately proportionally to the transverse acceleration per axle in order to counteract a rolling movement of the vehicle body so that the vehicle rolls only slightly. For this purpose, a roll momentum distribution is calculated from a plurality of measurement variables and their evaluation. The measurement variables are always evaluated only partially and compared with threshold values and checked for plausibility in order thus to replace measurement variables, for example measurement variables which are subject to noise, with comparable calculation values which are based on other measurement variables.

The roll momentum distribution can additionally be influenced, for example, by means of a switch which can be actuated manually by the driver, in order to give the vehicle, at least in certain areas, two different travel characteristics. By means of this switch it is possible to select between a comfortable travel behavior and a sporty travel behavior. In a sporty setting, the motor vehicle reacts in a more agile way. It has a travel behavior with an over-steering tendency. In contrast to this, in a comfortable setting the vehicle acts more in an under-steering fashion.

Under traveling conditions in the critical area, vehicles tend to skid or yaw. If this is the case, at least one axle of the vehicle loses its side guiding properties and slips in the direction of the outside of the bend being traveled through. This behavior is generally referred to as skidding or yawing. In such situations, load changes or alternate spring compression and spring extension are very dangerous. These oscillating loads mean that the vehicle tends toward a self-amplifying rolling movement. In order to be able to react in good time to these traveling states, the yaw rate of the vehicle is measured. This measured yaw rate is then compared with a setpoint value of the yaw rate which is matched to the vehicle. This setpoint value can correspond to a characteristic variable, assigned to the traveling situation, from a characteristic diagram. If this setpoint value, including a tolerance range to be taken into account, is then exceeded, this value is used to determine a roll momentum distribution.

In order to permit the invention to be used in off-road vehicles, a switch for off-road traveling mode is provided, similar to the sport/comfort switch. As large rolling movements already occur in the off-road mode when traveling slowly, due to extreme torsion effects and spring compression and extension, an incline compensation is taken into account here for the specific traveling situation along an incline. Here, a current angle of inclination is determined and compared with a setpoint angle of inclination. When a threshold value which is made up of the setpoint angle of inclination and predefined characteristic diagram tolerances is reached, if the switch is activated for off-road traveling mode up a corresponding roll momentum distribution is brought about for this purpose by the associated activation of the actuators.

In order to determine the momentary angle of inclination, the input variables of the transverse acceleration, of the rolling angle and the momentary spring travel values of the wheels are measured. The momentary spring travel values of the wheels are compared with setpoint spring travel values of the wheels, the setpoint spring travel values being predefined in accordance with the dependence on transverse acceleration and pitch angle. If the comparison between the setpoint angle of inclination and the momentary angle of inclination gives rise to a larger value than 1, or at least a value equal to 1, a new roll momentum distribution with associated activation of the actuators is initiated.

This roll momentum distribution also takes into account slipping away or yawing when traveling slowly on the incline. This is of particular importance since as a result the vehicle can be prevented from tipping.

An additional danger may be caused by sudden pitching when starting or braking. As the vehicle is additionally caused to roll when traveling slowly on an incline and when there is simultaneous steering and sudden braking, starting or accelerating from a specific speed, there is an increased risk of tipping. In the normal driving mode, this tendency to tip is present to a lesser degree and is significant only when cornering. In order to compensate such pitching when starting and braking, a roll momentum distribution is determined taking into account the pitching when starting and braking. Input variables which are included here are matching of the wheel speeds, the engine torque, the selected gear, the steering wheel angle and the momentary spring compression or extension of the front axle and of the rear axle.

In order to be able to find a way of calculating the starting acceleration and braking support, there must be a deviation from a predefined wheel speed range when matching the wheel speeds.

Such a method is suitable for normal road vehicles and off-road vehicles. Of course, this method can also be used in utility vehicles, building machinery and agricultural vehicles and their trailers. As such vehicles are often used off-road, a considerable contribution to operational safety is provided with the method.

Further details of the invention will become apparent from the following description based on the a plurality of flowcharts of a schematically illustrated embodiment. The reference symbols are explained in a list of reference symbols at the end of the description.

DETAILED DESCRIPTION OF THE FLOW CHARTS

Figure 1:
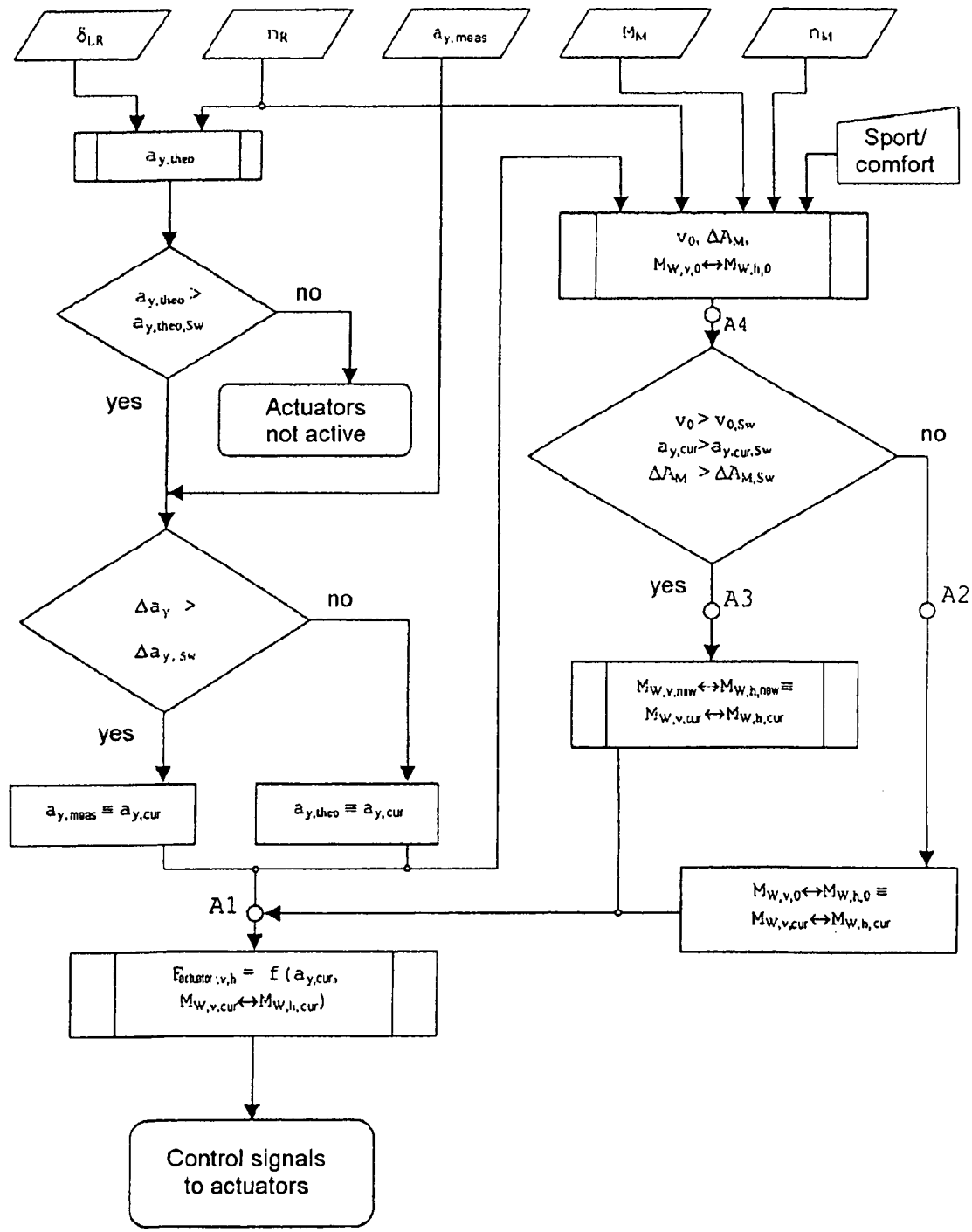
FIG. 1 shows a flowchart for determining the active actuation forces from the transverse acceleration and the roll momentum distribution.

FIG. 1 shows a flowchart which is used to determine the transverse acceleration. The steering wheel angle, the rotational speeds of the vehicle wheels and the transverse acceleration are measured directly or indirectly.

The steering wheel angle supplies, together with the steering gear transmission ratio, the direction of travel or the radius of the bend being negotiated at a particular time. Instead of the steering wheel angle it is possible, in particular in all-wheel steering systems, also to measure the wheel steering angles of all the steered wheels.

The traveling speed which is necessary to calculate the transverse acceleration is generally obtained from the average traveling speed of the non-driven wheels of a vehicle axle.

The transverse acceleration can be calculated ahead of the measured transverse acceleration and is not subject to noise as much as the measured transverse acceleration. It is therefore better suited for the control of the system.

The calculated transverse acceleration is continuously compared with a threshold value which distinguishes the instances of cornering travel and the instances of theoretical straight-ahead travel that is traveling with or without the need for roll compensation. The system is deactivated below the threshold value, for example when traveling straight ahead. Then the actuators are inactive.

If the threshold value is exceeded, the difference between the calculated or theoretical transverse acceleration and the measured one is calculated and compared with a differential threshold value. Both values are low-pass filtered before the comparison. If the difference is greater than the differential threshold value, sliding switch-over to the measured transverse acceleration takes place. The latter is used as a momentary transverse acceleration for the further calculations. This has the advantage that, under extraordinary travel conditions, incorrect interpretations of the calculated transverse accelerations are avoided, such as, for example, when the vehicle is skidding. In this context, an incidental involuntary counter steering reaction of the driver would result in an incorrect transverse acceleration value.

A roll momentum distribution is calculated for the first time, together with the selection of the switch position of the comfort/sport switch, using the engine torque, the engine speed, and the average traveling speeds of the wheels. The actuators are preset in accordance with this first-calculated roll momentum distribution. At the same time, the change in the drive torque is determined as a function of the average traveling speed of the drive axle wheels, of the engine torque and of the engine speed.

The traveling speed, the change in the drive torque and the momentary transverse acceleration are continuously compared with corresponding, predefined threshold values. If all three threshold values are exceeded in the exemplary embodiment, new roll momentum distributions are calculated in accordance with the degrees by which the threshold values are exceeded. Otherwise, the first-calculated roll momentum distribution is maintained.

The actuator forces are determined from the momentary roll momentum distribution and the momentary transverse acceleration. Control signals, by means of which, for example in the case of hydraulic actuators, the valves are controlled or regulated in order to act on the hydraulic motors, are generated from the actuator forces.

Of course, in addition to the input variables illustrated in FIG. 1, all the necessary vehicle-typical and actuator-typical data are included in the calculations of the actuator forces.

Figure 2:
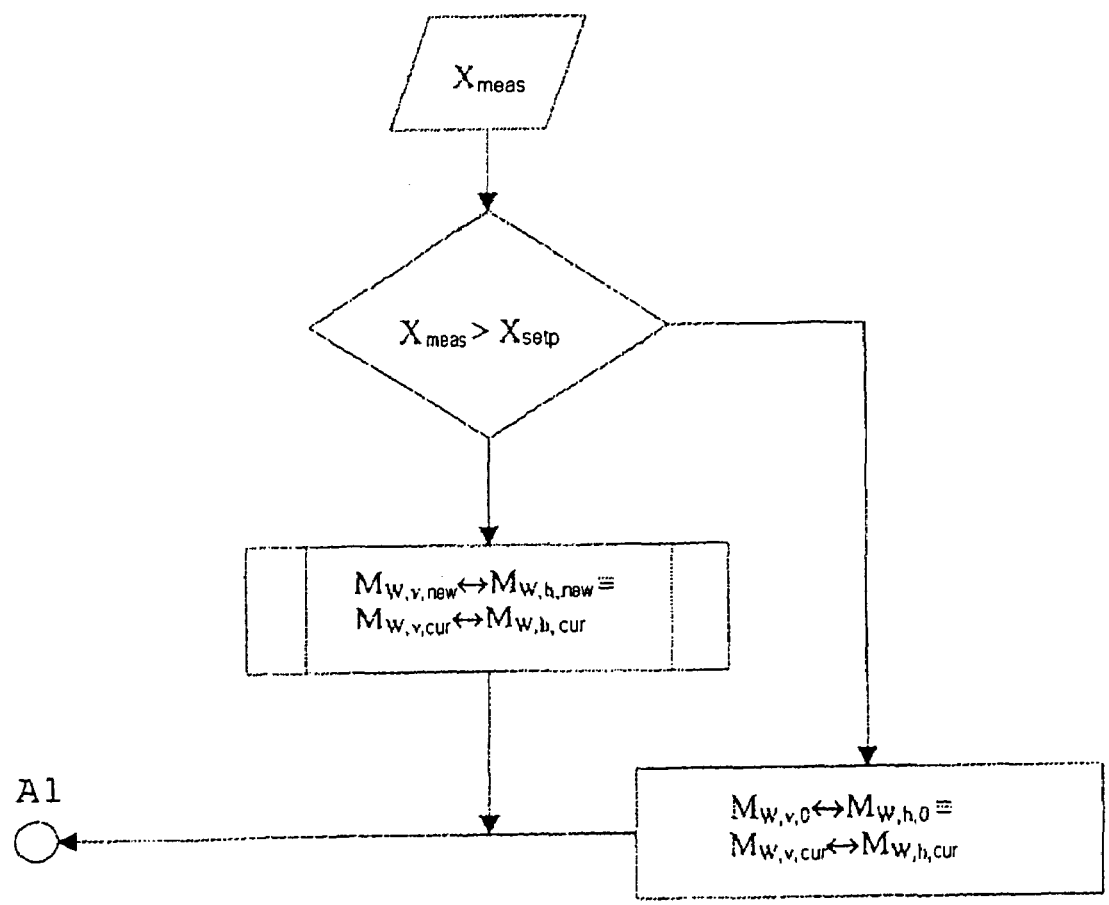
FIG. 2 shows a flowchart for determining the roll momentum distribution using the yaw rate.

FIG. 2 shows a flowchart for determining the roll momentum distribution using the yaw rate. The measured yaw rate is continuously compared with a setpoint yaw rate corresponding to the respective traveling state. If this setpoint value is exceeded, a new roll momentum distribution is calculated in accordance with the degree by which the setpoint value is exceeded. This calculation is based on the calculation of the roll momentum distribution taking into account parameters used in FIG. 1 such as traveling speed, change in drive momentum and momentary transverse acceleration.

If the setpoint value is not exceeded, the same conditions as in FIG. 1 apply the first-calculated roll momentum distribution is maintained.

Figure 3:
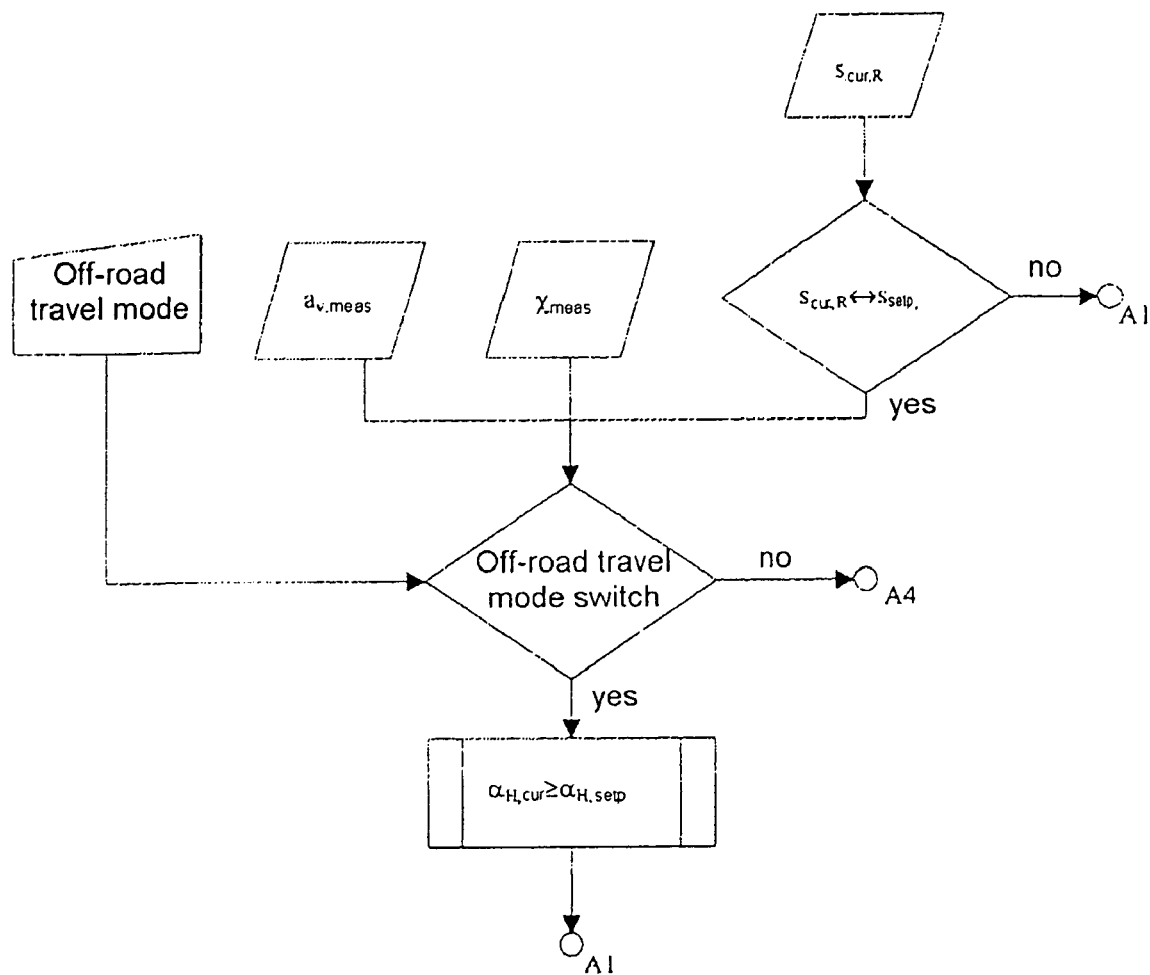
FIG. 3 shows a flowchart for determining the active actuation forces when traveling off-road and traveling slowly along an incline.

FIG. 3 shows a flowchart for determining the active actuation forces for off-road travel and traveling along an incline. Depending on the activation of the switch for off-road travel, the calculation of an angle of inclination is determined using the comparative consideration of a current angle of inclination and a setpoint angle of inclination. For this purpose, the parameters of the measured transverse acceleration, the measured pitch angle and the current spring travel values of the wheels are continuously interrogated.

In the travel mode, the momentary spring travel values along an incline are continuously compared with corresponding setpoint spring travel values and, given a positive and negative deviation, they are included in the integration for calculation purposes.

If no deviation occurs, the momentary spring travel value of the wheels is used as a further calculation variable for determining the actuation forces of the actuators at the front axle and rear axle. The corresponding signal is, as apparent from the flowchart in FIG. 1, initiated at the connection A1. If a deviation occurs, this value, with the measured parameters of the transverse acceleration and of the pitch angle, is used to calculate a momentary angle of inclination. If this momentary angle of inclination deviates from a predefined angle of inclination, a value which is selected in accordance with this deviation is fed to the connection A1 in FIG. 1 in order to determine the actuation forces of the actuators.

If the deviation between the current angle of inclination and predefined angle of inclination is small and thus lies in a predefined range, the vehicle does not have a significant tendency toward inclination. In this case, the signal flow branches at the connection A4 in FIG. 1, where a roll momentum distribution is determined by means of the traveling speed, the change in the drive torque and the transverse acceleration.

Figure 4:
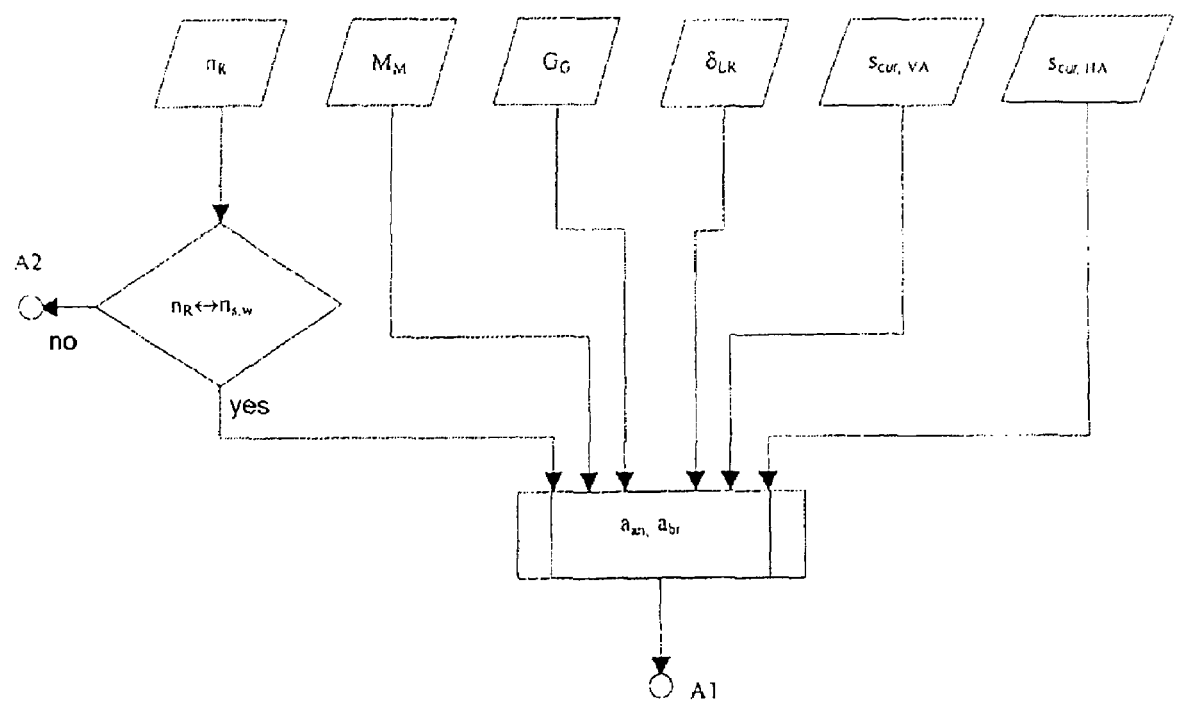
FIG. 4 is a flowchart for determining the active actuation forces for starting-up acceleration and for braking deceleration.

FIG. 4 shows a flowchart for determining the active actuation forces for starting acceleration and braking deceleration. A starting acceleration or a braking deceleration is determined using the following input parameters of the engine torque, the gear engaged, the setting of the steering wheel, the current spring compression of the front axle and the rear axle as well as the wheel speeds.

In a relative consideration of the wheel speeds at a particular time, the wheel speeds result in a correspondingly predetermined wheel speed threshold value. If considerable differences are determined in the process, these values are used for calculating the starting-up acceleration and the braking deceleration. If the deviation is insignificant, the signal flow branches at the connection A2 in FIG. 1.

The calculated starting acceleration or braking deceleration is used, by means of the connection A1 in FIG. 1, to calculate the active actuation forces of the actuators.

| Listing of reference symbols | |
|---|---|
| $a_{y, meas}$ | Transverse acceleration, measured |
| $a_{y, theo}$ | Transverse acceleration, calculated |
| $a_{y, cur}$ | Transverse acceleration, current |
| $a_{y, theo, Sw}$ | Threshold value for the theoretical transverse acceleration |
| $a_{y, cur, Sw}$ | Threshold value for the current transverse acceleration |
| $a_{an}$ | Starting-up acceleration, positive acceleration |

-continued

Listing of reference symbols

| | |
|---|---|
| $a_{br}$ | Braking deceleration, negative acceleration |
| $\delta_{LR}$ | Steering wheel angle |
| $\Delta a_y$ | Difference between theoretical and measured transverse acceleration |
| $\Delta a_{y,Sw}$ | Threshold value for the transverse acceleration difference |
| $\Delta A_M$ | Change in drive torque |
| $\Delta A_{M,Sw}$ | Threshold value for the change in drive torque |
| $F_{actuator,v,h}$ | Actuation force of the actuators at the front and rear axles |
| $M_M$ | Engine torque |
| $M_{W,v}$ | Roll momentum, front |
| $M_{W,h}$ | Roll momentum, rear |
| $M_{W,v,0} \leftrightarrow M_{W,h,0}$ | Roll momentum distribution, first-calculated |
| $M_{W,v,new} \leftrightarrow M_{W,h,new}$ | Roll momentum distribution, new |
| $M_{W,v,cur} \leftrightarrow M_{W,h,cur}$ | Roll momentum distribution, current |
| $n_M$ | Engine speed |
| $n_R$ | Rotational speeds of the vehicle wheels |
| $n_{Sw}$ | Threshold value wheel speed |
| $v_0$ | Vehicle speed |
| $v_{0,Sw}$ | Threshold value of the vehicle speed |
| $\psi_{meas}$ | Yaw rate, measured |
| $\psi_{setp}$ | Setpoint yaw rate |
| $s_{cur,R}$ | Spring travel, momentary at the wheel |
| $s_{setp,R}$ | Setpoint spring travel at the wheel |
| $s_{cur,VA}$ | Spring compression, momentary at the front axle |
| $s_{cur,VH}$ | Spring compression, momentary at the rear axle |
| $\lambda$ | Wheel slip |
| $\chi$ | Pitch angle |
| $G_G$ | Transmission gear |
| $\alpha_{H,cur}$ | Angle of inclination, momentary |
| $\alpha_{H,setp}$ | Angle of inclination, setpoint |

What is claimed is:

1. In a method for influencing the roll behavior in motor vehicles, having a vehicle body with an engine and at least three wheels, for each wheel or stabilizer with at least one actuator acting on the wheels and the vehicle body, and a steering wheel for steering said motor vehicle, said method comprising the steps of measuring a steering wheel angle ($\delta_{LR}$), a traveling speed ($v_0$), a transverse acceleration ($a_{yr}$) of the vehicle and at least the speed ($n_M$) of said engine, calculating the theoretical transverse acceleration ($a_{y,theo}$) of the vehicle from the steering wheel angle ($\delta_{LR}$) and the traveling speed ($v_0$), calculating a roll momentum distribution ($M_{W,v} \leftrightarrows M_{W,h}$) from a measured transverse acceleration ($a_{y,meas}$) or the calculated transverse acceleration ($a_{y,theo}$), the engine speed ($n_M$) and a variable which is proportional to the position of the accelerator pedal, determining the actuator forces from the data relating to the transverse acceleration ($a_{y,meas}$ or $a_{y,theo}$) and a roll momentum distribution ($M_{W,v} \leftrightarrows M_{W,h}$), and controlling the supply of energy to the actuators on the basis of the data relating to the respective actuator forces ($F_{actuator}$), the improvement, wherein the wheel speeds ($n_R$) at least at two wheels of an axle are measured, and the traveling speed ($v_0$) which is necessary to calculate the transverse acceleration ($a_{y,theo}$) is calculated from the wheel speeds ($n_R$), the engine torque ($M_M$) is determined from at last one of measurements made at the drive engine and engine-typical measurement data and characteristic diagrams, the theoretical transverse acceleration ($a_{y,theo}$) is compared with a threshold value ($a_{y,theo,Sw}$), the actuators being inactive until the threshold value ($a_{y,theo,Sw}$) is reached, and, when the threshold value ($a_{y,theo,Sw}$) is exceeded, the difference ($\Delta a_y$) between the theoretical transverse acceleration ($a_{y,theo}$) and the measured transverse acceleration ($a_{y,meas}$) is determined, the difference ($\Delta a_y$) is compared with a differential threshold value ($\Delta a_{y,Sw}$), the calculated transverse acceleration ($a_{y,theo}$) being used as the momentary transverse acceleration ($a_{y,cur}$) until the differential threshold value ($\Delta a_{y,Sw}$) is reached, and, when the differential threshold value ($a_{y,Sw}$) is exceeded, the measured transverse acceleration ($a_{y,meas}$) is used as the momentary transverse acceleration ($a_{y,cur}$), a roll momentum distribution ($M_{W,v,0} \leftrightarrows M_{W,h,0}$) is determined for a predefined, normal traveling state range as a function of the rotational speeds ($n_R$) of the vehicle wheels of an axle, the momentary transverse acceleration ($a_{y,cur}$) and a change ($\Delta A_M$) in the drive torque, the rotational speeds ($n_R$) of the axles or wheels, the current transverse acceleration ($a_{y,cur}$) and the change ($\Delta A_m$) in the drive torque are compared with corresponding threshold values ($v_{0,Sw}, a_{y,cur,Sw}, \Delta A_{M,Sw}$), the first-translated roll momentum distribution ($M_{W,v,0} \leftrightarrows M_{W,h,0}$) being used as the momentary roll momentum distribution ($M_{W,v,cur} \leftrightarrows M_{W,cur}$) until the threshold values ($v_{0,Sw}, a_{y,cur,Sw}, \Delta A_{M,Sw}$) are reached, and, when at least two of the aforesaid threshold values ($v_{0,Sw}, a_{y,cur,,Sw}, \Delta A_{M,Sw}$) are exceeded, a new, current roll momentum distribution ($M_{W,v,new} \leftrightarrows M_{W,h,new} = M_{W,v,cur} \leftrightarrows M_{W,h,cur}$) is calculated, the actuation forces ($F_{actuator,v,h}$) of the actuators are calculated as functions of the momentary transverse acceleration ($a_{y,cur}$) and the current roll momentum distribution ($M_{W,v,cur} \leftrightarrows M_{W,h,cur}$), and a start-up acceleration ($a_{an}$) or a braking deceleration ($a_{br}$) is calculated from the rotational speeds ($n_R$) of the axle wheels, from the engine torque ($M_M$), from the gearspeed ($G_G$), from the current spring compressions at the front and rear axles ($s_{cur,VA}, s_{cur,VH}$) and from the steering wheel angle ($\delta_{LR}$).

2. The method as claimed in claim 1, wherein, in order to calculate the roll momentum distribution ($M_{M,v,cur} \leftrightarrows M_{W,h,cur}$), a manually actuatable switch which permits selection between a calculation mode for the comfortable and a sporty driving style is interrogated.

3. The method as claimed in claim 1, wherein as the actuators one of hydraulic motors and hydropneumatic components are used.

4. The method as claimed in claim 1, wherein a measured yaw rate ($\omega_{meas}$) is compared with a setpoint yaw rate ($\omega_{setp}$), a current roll momentum distribution ($M_{M,v,cur} \leftrightarrows M_{W,h,cur}$) being determined as a function of the vehicle speed ($v_0$), the change ($\Delta A_M$) in the drive torque and the transverse acceleration ($a_{y,meas}$).

5. The method as claimed in claim 1, wherein with the calculation of the momentary roll momentum distribution ($M_{M,v,cur} \leftrightarrows M_{W,h,cur}$) from the pitch angle ($\chi_{meas}$), the momentary wheel spring travel values ($s_{cur,R}$), the corresponding wheel setpoint spring travel values ($S_{setp,R}$) and the transverse acceleration ($a_{y,meas}$), a switch which can be manually actuated by the driver and which permits selection between a normal driving mode and an off-road driving mode is interrogated.

* * * * *